(12) United States Patent
Washio et al.

(10) Patent No.: US 7,450,929 B2
(45) Date of Patent: Nov. 11, 2008

(54) COMMUNICATION SYSTEM, COMMUNICATION TERMINAL DEVICE, AND INFORMATION STORAGE MODULE

(75) Inventors: Satoshi Washio, Sapporo (JP); Kazuhiro Yamada, Yokohama (JP); Dai Kamiya, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 11/016,570

(22) Filed: Dec. 17, 2004

(65) Prior Publication Data
US 2005/0181819 A1  Aug. 18, 2005

(30) Foreign Application Priority Data
Dec. 18, 2003  (JP) ............................. 2003-421371

(51) Int. Cl.
*H04Q 7/20*  (2006.01)
(52) U.S. Cl. .................... 455/410; 455/411; 455/558; 455/418
(58) Field of Classification Search ............... 455/410, 455/411, 418, 558
See application file for complete search history.

(56) References Cited

U.S. PATENT DOCUMENTS 6,141,563 A * 10/2000 Miller et al. ................ 455/558
6,481,632 B2 * 11/2002 Wentker et al. ............. 235/492
2003/0224823 A1  12/2003 Hurst et al.
2004/0103064 A1 *  5/2004 Howard et al. ................ 705/55
2004/0248550 A1 * 12/2004 Hausner et al. ............. 455/410

FOREIGN PATENT DOCUMENTS

| EP | 1107623 A2 * | 6/2001 |
| EP | 1 130 495 | 9/2001 |
| EP | 1 338 938 | 8/2003 |
| GB | 2369205 A * | 5/2002 |
| JP | 11-25017 A1 | 1/1999 |
| JP | 1 280 149 | 1/2003 |

OTHER PUBLICATIONS

European Search Report dated May 19, 2006.
European Patent Application No. 04 028 574.4—2212, Office Action dated Oct. 11, 2006.

* cited by examiner

*Primary Examiner*—Erika A Gary
(74) *Attorney, Agent, or Firm*—Brinks Hofer Gilson & Lione

(57) ABSTRACT

A UIM 12 stores a phone number of a user and authorization information for content owned by the user. A management device 14 stores correspondence information showing correspondence between a user and content owned by the user. When a content provider deletes from management device 14 correspondence information containing content to be disabled, authorization information corresponding to the content is deleted from UIM 12. When a user deletes from UIM 12 authorization information for content which is no longer in use, correspondence information for the content is deleted from management device 14.

47 Claims, 7 Drawing Sheets

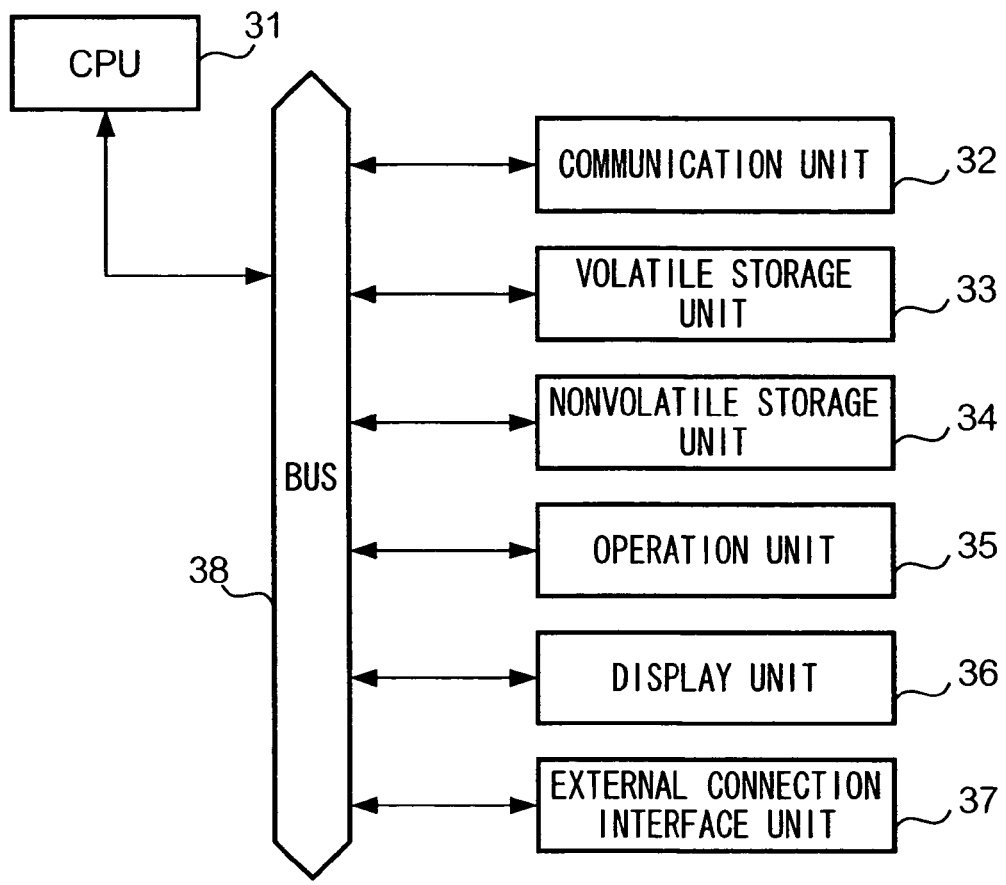
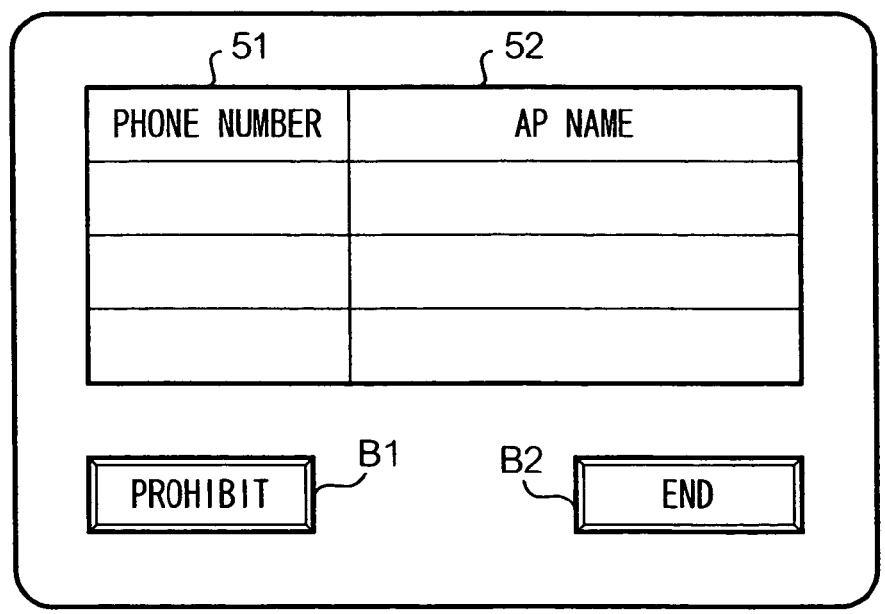

COMMUNICATION SYSTEM, COMMUNICATION TERMINAL DEVICE, AND INFORMATION STORAGE MODULE

RELATED APPLICATIONS

The present patent document claims the benefit of the filing date under 35 U.S.C. §119 of Japanese Patent Application No. 2003-421371, filed on Dec. 18, 2003, which is hereby incorporated by reference herein.

BACKGROUND

1. Technical Field

The present invention relates to a technique for restricting use of content stored in a communication terminal device.

2. Background Information

There are now in wide-spread use mobile phones that have a browsing capability and that are able to download and store programs, sound and image data (hereinafter, content) from a WWW (World Wide Web) server on the Internet. Subject to agreement and payment of a fee, as necessary, a user of such a phone is able to download, store and own desired content. Such a mobile phone used by the user to download, store and own such content is used to execute a program to enable content to be utilized, and also has output sound means to output sound of content, and display means for displaying content.

A technique has been proposed in the art where a management device stores content that is the same as that owned by a user, which management device is capable of communicating with the user's mobile phone, such that content owned by a user is updated when content stored in the management device is updated. For example, a technique disclosed in Japanese Patent Application Laid-Open Publication No. 11-25017 (hereinafter, JP 11-25017) provides a management device for storing a destination registration table in which a phone number of a user's mobile phone is stored, and for transmitting a message requesting a mobile phone whose phone number is registered in the destination registration table to update content when corresponding content stored in the management device is updated. A mobile phone, when receiving the message, updates content stored in the phone based on details of the message. Content stored in a mobile phone is thus updated when corresponding content stored in a management device is update.

However, content stored or updated in a mobile phone may expire or be subject to unauthorized use. Also, a user may no longer wish to use content stored in his/her mobile phone and may wish to cancel a usage contract which authorizes use of the content. In such a case, a management device of the same type as the above may be used to store correspondence information, with a record in the correspondence information showing correspondence between a user and content owned by the user. Accordingly, when a record of content used by a user is deleted from the correspondence information stored in the management device, content to be deleted from a user's mobile phone is identified on the basis of the deleted record. Conversely, in a case that a user deletes content from a phone, the management device can be caused to delete a record of the content from the stored correspondence information. By using such a system a content provider, hereinafter, a CP (content provider), is able to prevent unauthorized use of content by deleting a record of content from correspondence information stored in a management device, when such a record is deemed to have expired or to be subject to unauthorized, for example unpaid, use. As stated above, the converse also applies in that a user is able to delete content stored in his/her mobile phone, thereby prompting deletion of the content record at the management device side and avoiding the need for time consuming cancellation of a contract using documentation.

A new type of a mobile phone has recently been proposed, having mounted thereto a removable User Identity Module (hereinafter, UIM) containing an identifier such as a user's phone number for uniquely identifying a user on a communication network. A user is able to use different mobile phones with a single phone number by mounting a UIM to a mobile phone as required. For example, a UIM may be switched between a mobile phone used for storing business-related content and a mobile phone for private use for storing content such as game programs depending on the circumstances of the user.

A problem arises, however, in a case where more than one mobile phones is being used by a user by way of a UIM and content stored in one of the mobile phones (first mobile phone) is no longer authorized for use by the user, if the content stored in the first mobile phone is caused to be deleted by the above-mentioned management device. Namely, a management device transmits a message requesting a mobile phone to delete the content, specifying the destination of the message with a user's phone number, and the request is received by a mobile phone having mounted a UIM which contains information of the destination phone number at the time of receiving the request. However, the receiving mobile phone may not necessarily be the mobile phone storing the content corresponding to the deleted content record (first mobile phone) but may be a different mobile phone (second mobile phone) in which no such content is stored. As will be apparent, in such a case, the content at issue is not deleted if the request is received by the second mobile phone. Moreover, a further case can be readily envisaged wherein the second mobile phone is not owned by the same user as the one who owns the first mobile phone, and the same content, this case, authorized, as that stored in the first mobile phone is stored in the second mobile phone. In such a case, the second mobile phone is caused to delete the content, even though its use is authorized for a legitimate user, as a result of receipt at the phone of a request to delete the content. Consequently, a CP is thus not able to reliably prevent unauthorized use of content when a single UIM is used for different mobile phones storing content.

SUMMARY OF THE INVENTION

The present invention has been envisioned under the above-stated situation, and its object is to enable a CP (content provider) to prevent unauthorized use of content stored in a communication terminal device having a UIM capability, and also to enable a user to easily indicate an intention of discontinuing the use of content, to a content provider.

To solve the above problem, the present invention provides a communication system comprising: an information storage module capable of storing an identifier for uniquely identifying in a communication network an authorized user of the module, and of storing authorization information that indicates authorization of the user to use content owned by the user; a communication terminal device to or from which the information storage module can be mounted or dismounted, the communication terminal device being capable of storing content, and being capable of disabling use of content when it is deemed that authorization information for the content among the stored content is not stored in the information storage module when the module is mounted to the communication device; and a management device capable of storing correspondence information showing correspondence between a user and stored content owned by the user, of deleting one item of correspondence information pertaining to stored content whose use by a user is no longer authorized, and of controlling the communication terminal device or the information storage module mounted to the communication terminal device to delete authorization information corresponding to the unauthorized stored content from the information storage module mounted thereto.

The present invention further provides a communication terminal device, comprising: storage means for storing content owned by a user; mounting means for mounting a removable information storage module for storing an identifier uniquely identifying a user in a communication network and authorization information that indicates authorization of the user to use content owned by the user; control means capable of disabling, from among content stored in the storage means, use of content when it is deemed that authorization information is not stored in the information storage module when the module is mounted to the mounting means; and deleting means capable of deleting authorization information from the information storage module mounted by the mounting means, the authorization information to be deleted being specified in a notification received from a management device which is capable of storing correspondence information showing correspondence between a user and stored content owned by the user and of deleting one item of correspondence information for content whose use is to be disabled, the notification functioning to request the communication terminal device to delete the authorization information for content whose correspondence information has been deleted from the management device.

The present invention still further provides an information storage module, comprising: storage means capable of storing an identifier for uniquely identifying a user in a communication network, and of storing authorization information that indicates authorization of the user to use content owned by the user; mounting means for mounting to or dismounting from a communication terminal device the information storage module, the communication terminal device being capable of storing content owned by a user, and of communicating with a management device which stores correspondence information indicating a user and stored content owned by the user; control means capable of disabling use of content whose authorization information is not stored in the storage means, from among the content stored in the communication terminal device to which the module is mounted by the mounting means; and deleting means capable of deleting authorization information corresponding to content specified by a notification received from the management device, the notification being transmitted when one item of correspondence information containing content whose use is to be disabled is deleted from the management device.

Using the above system, communication terminal device, and information storage module causes authorization information of content whose use is to be disabled stored in the information storage module, to be deleted when correspondence information pertaining to the content is deleted from the management device.

To solve the above problem, the present invention provides a communication system comprising: a management device capable of storing correspondence information showing correspondence between a user and stored content owned by the user; an information storage module capable of storing an identifier for uniquely identifying a user in a communication network and authorization information that indicates authorization of the user to use content owned by the user; and a communication terminal device to or from which the information storage module can be mounted or dismounted, the communication terminal device being capable of storing content, of disabling use of content when it is deemed that authorization information for the content among stored content is not stored in the information storage module when the module is mounted to the communication device, of prompting a user to specify content among the stored content which is no longer used by the user so as to delete authorization information for the content specified by the user from the information storage module mounted thereto, and of controlling the management device to delete one item of correspondence information corresponding to the specified content.

In another preferred embodiment, the present invention provides a communication system comprising: a management device capable of storing correspondence information showing correspondence between a user and stored content owned by the user; a communication terminal device capable of storing content owned by a user and of communicating with the management device; and an information storage module which can be mounted to or dismounted from the communication terminal device, the module being capable of storing an identifier for uniquely identifying a user in a communication network, and of storing authorization information that indicates authorization of the user to use the content owned by the user, the information storage module when mounted to the communication terminal device being capable of disabling use of content, from among content stored in the communication terminal device, when it is deemed that authorization information for the content is not stored in the module, of prompting a user to specify content which is no longer used by the user so as to delete authorization information for the content specified by the user from the module, and of controlling the management device to delete one item of correspondence information corresponding to the specified content.

The present invention further provides a communication terminal device comprising: storage means for storing content owned by a user; mounting means for mounting a removable information storage module for storing an identifier uniquely identifying a user in a communication network, and for storing authorization information that indicates authorization of the user to use content owned by the user; control means capable of disabling, from among content stored in the storage means, use of content when it is deemed that authorization information is not stored in the information storage module when the module is mounted by the mounting means; and deleting means capable of prompting a user to specify content, from among content whose authorization information is stored in the information storage module mounted by the mounted means, which is no longer used by the user so as to delete authorization information for the content specified by the user from the information storage module, and of controlling a management device storing correspondence information between a user and stored content owned by the user to delete one item of correspondence information corresponding to the specified content.

The present invention still further provides an information storage module comprising: storage means capable of storing an identifier for uniquely identifying a user in a communication network, and of storing authorization information that indicates authorization of the user to use content owned by the user; mounting means for mounting to or dismounting from a communication terminal device the information storage module, the communication terminal device being capable of storing content owned by a user, and of communicating with a management device which stores correspondence information showing a user and content owned by the user; control means capable of disabling use of content whose authorization information is not stored in the storage means, from among the content stored in the communication terminal device to which the module is mounted by the mounting means; and deleting means capable of prompting a user to specify content, from among content whose authorization information is stored in the storage means, which is no longer used by the user so as to delete from the storage means authorization information for the content specified by the user, and of controlling the management device to delete one item of correspondence information corresponding to the specified content through the communication terminal device to which the information storage module is mounted by the mounting means.

The use of the above system, communication terminal device, and information storage module causes one item of correspondence information pertaining to content which is no longer used by a user to be deleted from the management device when authorization information for the content is deleted from the information storage module.

According to the present invention, when correspondence information showing correspondence between a user and content owned by the user is deleted from a management device, authorization information for the content is also deleted from a UIM which is owned by the user. As a result, the use of the content is disabled, and a CP is able to reliably prevent unauthorized use of content by a user.

Also, when a user disables content which s/he owns, correspondence information showing correspondence between the disabled content and the user is deleted from a management device. Thus, a user is able to easily indicate an intention to a CP that s/he no longer wishes to use particular content, thereby avoiding unnecessary time and trouble which would otherwise be incurred in canceling a content usage contract on a document basis.

BRIEF DESCRIPTION OF THE DRAWINGS

FIG. 3 is a block diagram showing an example of a configuration of DTE 11 in the communication system.

FIG. 5 is a diagram showing an example of a screen format of a management screen displayed on display unit 36 of management device 14.

DETAILED DESCRIPTION OF THE PREFERRED EMBODIMENTS

In the following, description will be given of embodiments of a communication system according to the present invention with reference to the attached drawings.

1: First Embodiment 1-1: Configuration of System

Figure 1:
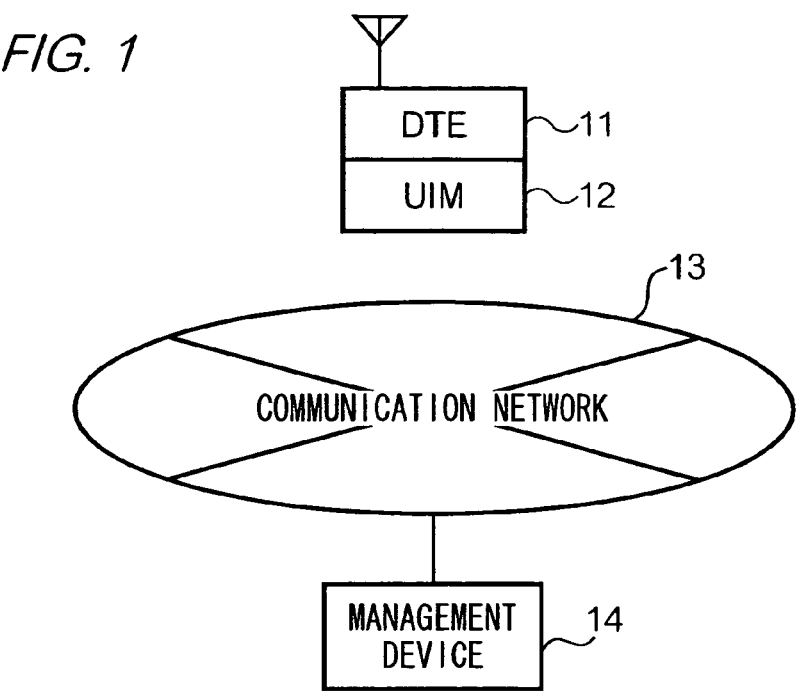
FIG. 1 is a diagram showing an example of a configuration of a communication system according to a first embodiment of the present invention.

FIG. 1 is a diagram showing an example of a configuration of a communication system according to a first embodiment of the present invention. As shown in the figure, the communication system comprises a communication terminal device (hereinafter, a "DTE (data terminal equipment)") 11, a removable UIM 12 mounted to DTE 11, a communication network 13 that serves DTE 11 with UIM 12 mounted thereto, and a management device 14 that communicates with a UIM 12-mounted DTE 11 through communication network 13.

Figure 2:
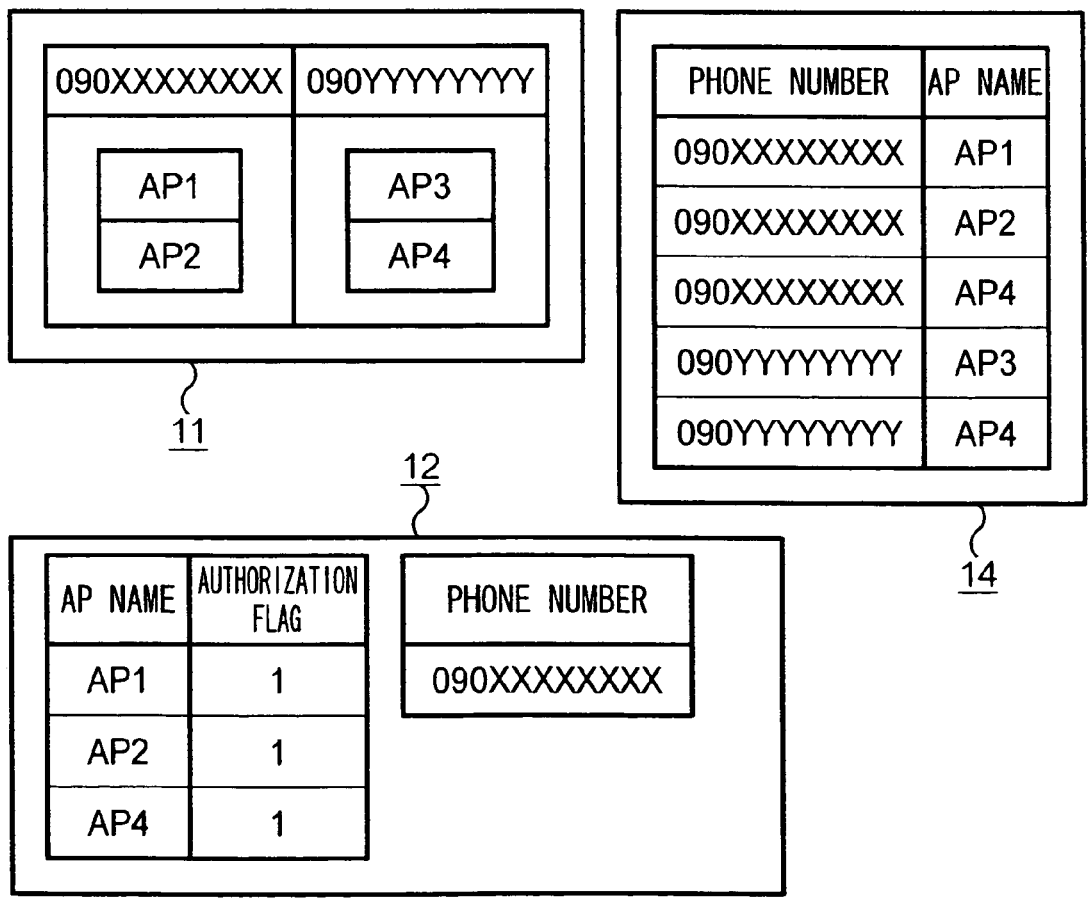
FIG. 2 is a diagram showing an example of details stored in a DTE (data terminal equipment) 11, a UIM 12, and a management device 14.

UIM 12 is, for example, an IC card, and stores, as shown in FIG. 2, a phone number of a user who owns or an authorized user of UIM 12 and an authorization information table (to be described later in detail). DTE 11 is a mobile phone having a browsing function, and a UIM 12 can be mounted to or removed from DTE 11 freely as the situations demand. DTE 11 with a UIM 12 mounted is served by communication network 13 and is capable of receiving, through communication network 13, information destined for the phone number stored in the UIM 12.

A user can instruct DTE 11 to download a desired application program (hereinafter, "AP") from a WWW server (not shown) by mounting his/her own UIM 12 to DTE 11. When a user downloads an AP, DTE 11 stores the AP, as shown in FIG. 2, in correspondence with the phone number stored in mounted UIM 12. UIM 12 stores an authorization information table containing a name of a downloaded AP (hereinafter, "AP name") stored in DTE 11, the AP name being associated with an authorization flag indicating whether or not an owner of UIM 12 identified by the phone number is permitted to use the AP. For example, when a value of the authorization flag is set as "1", the use of an AP is permitted, but when "0", not permitted. Hereinafter, a pair of an AP name and an authorization flag which are associated with each other will be referred to collectively as "authorization information." A user is permitted or authorized to use an AP stored in DTE 11 if the AP is associated with a phone number stored in his/her own UIM 12 mounted to DTE 11 and if authorization information associated with the AP shows that the use of the AP is permitted.

It should be noted that FIG. 1 shows only a pair of a DTE 11 and a UIM 12, whereas in actuality a plurality of pairs exist.

Communication network 13 comprises base stations, switching stations, and a gateway device (hereinafter, "GW"), none of which are shown in the figure. GW is a computer device for interconnecting communication network 13 and the Internet (not shown), and has a means for converting a communication protocol followed in communication network 13 into a communication protocol followed in a different communication network, and vice versa. Base stations are located on the ground at set intervals. Each base station serves a UIM 12-mounted DTE 11 located within a certain range (e.g., within a 500 meter radius) of where each base station is centered, and performs wireless communication with DTE 11. A switching station serves a plurality of base stations. A switching station receives a packet transmitted from DTE 11 mounted to UIM 12 and served by each base station, and relays the packet to its destination communication address via another switching station and/or its subordinate base station. The switching station relays packets exchanged between UIM 12-mounted DTE 11 and GW.

Management device 14 is a computer device connected, for example, to GW, and has a storage means for storing a correspondence information table, as shown in FIG. 2, which stores a user phone number in correspondence with an AP name which the user owns. A pair of a user phone number and an AP name associated with the phone number will be hereinafter referred to as "correspondence information."

In a communication system shown in FIG. 1, management device 14 is supplied with information identifying a user who is no longer authorized to use an AP and an AP name whose use by the user is to be prohibited, and is thereby instructed to prohibit use of a particular AP for a particular user. Management device 14 then deletes, from the correspondence information table, correspondence information containing the specified AP name and a phone number of the specified user, and transmits through communication network 13 a request message, destined for the phone number of the user, for deleting authorization information corresponding to the AP name. As the message is received by a DTE 11 having mounted thereto a UIM 12 storing the destined user phone number, DTE 11 deletes from UIM 12 authorization information corresponding to the specified AP so as to prohibit use of the AP. DTE 11 further deletes the AP stored in its storage means in a case where it stores the AP whose use is to be prohibited.

1-2: Configuration and Function of DTE 11

FIG. 3 is a block diagram showing an example of a hardware configuration of DTE 11. As shown in the figure, DTE 11 comprises a CPU (Central Processing Unit) 31 and a communication unit 32, a volatile memory 33, a nonvolatile memory 34, an operation unit 35, a display unit 36, an external connection interface unit 37, and a bus 38 relaying data exchanged between the units.

CPU 31, which will be described later in more detail, controls each unit of DTE 11 by executing software stored in nonvolatile memory 34. Communication unit 32 comprises an antenna and the like for performing wireless communication with a base station (not shown) in communication network 13. Communication unit 32 transmits data supplied from CPU 31 to communication network 13 and passes data received from communication network 13 to CPU 31.

Operation unit 35 is provided with ten keys, cursor keys, and the like, for receiving user's operation inputs. Operation unit 35 passes data corresponding to user's operation inputs over to CPU 31. Display unit 36 is, for example, a liquid crystal display for showing an image corresponding to image information supplied from CPU 31. External connection interface unit 37 is for receiving a UIM 12. Through external connection interface unit 37, power is supplied from DTE 11 to UIM 12, and data is exchanged between DTE 11 and UIM 12.

Volatile memory 33 is, for example, a RAM (Random Access Memory), and is used as a work area for CPU 31 in executing and running software. Nonvolatile memory 34 is, for example, an EEPROM (Electronically Erasable and Programmable Read Only Memory) and stores operating system (hereinafter, "OS") software, and other software for realizing functions of DTE 11 such as a browser and an AP management program (described later).

Nonvolatile memory 34 stores an AP downloaded from a WWW server through communication network 13. Specifically, as shown in FIG. 2, separate memory areas are provided for different phone numbers, and a downloaded AP is stored separately in a memory area corresponding to a phone number contained in DTE 11-mounted UIM 12 at a time of downloading the AP.

CPU 31 executes and runs software stored in nonvolatile memory 34, thereby to provide the following functions to DTE 11. When a power button (not shown) is pressed down by a user, CPU 31 of DTE 11 first reads OS software from nonvolatile memory 34 for activation. When the activation of the OS is completed, CPU 31 running s the OS is capable of controlling each unit of DTE 11. CPU 31 executes and runs the AP management program from nonvolatile memory 34, immediately after activation of the OS is completed.

According to the present invention, CPU 31, when running the AP management program is imparted a function particular to DTE 11. Specifically, CPU 31, upon receiving a message transmitted from management device 14, causes UIM 12 mounted to DTE 11 to delete authorization information according to the message and also deletes an AP corresponding to the deleted authorization information if it is stored in a memory area for a phone number which is contained in mounted UIM 12.

1-3: Configuration and Function UIM 12

A hardware configuration of UIM 12 differs from that of DTE 11 shown in FIG. 3 in that there are provided no communication unit 32, operation unit 35, or display unit 36 in UIM 12. UIM 12 can be mounted to DTE 11 by connecting an external connection interface unit 37 of UIM 12 to that of DTE 11.

A software configuration of UIM 12 differs from that of DTE 11, in that an authorization information delete program instead of the AP management program is stored in nonvolatile memory 34 and that, as shown in FIG. 2, a phone number of a user who owns UIM 12 and the authorization information table instead of an AP(s) are stored in nonvolatile memory 34.

CPU 31 of UIM 12 is imparted the following functions by executing software stored in nonvolatile memory 34 of UIM 12. When UIM 12-mounted DTE 11 is turned on, CPU 31 of UIM 12 receives power supply through external connection interface unit 37 from DTE 11. When power is supplied, CPU 31 of UIM 12 reads and activates OS software from nonvolatile memory 34. CPU 31 which is run under the OS can now control each unit of UIM 12. As soon as the activation of the OS is completed, CPU 31 executes and runs authorization information delete program from nonvolatile memory 34. CPU 31, by running the authorization information delete program, deletes authorization information from the authorization information table when it is instructed by CPU 31 of DTE 11 via external connection interface unit 37.

1-4: Configuration and Function of Management Device 14

A hardware configuration of management device 14 is basically the same as that of DTE 11 except that nonvolatile memory 34 is not an EEPROM but a hard disk and that external connection interface unit 37 is used to connect not to UIM 12 but to an auxiliary storage device. The auxiliary storage device reads data stored in a computer device readable recording medium such as a CD-ROM (Compact Disk- Read Only Memory) to pass the read data over to CPU 31 of management device 14 via external connection interface unit 37.

A software configuration of management device 14 differs from that of DTE 11 in that a correspondence information management program instead of the AP management program and a correspondence information table (refer to FIG. 2) instead of an AP are stored in nonvolatile memory 34.

CPU 31 of management device 14 is imparted with functions described below by executing and running software stored in nonvolatile memory 34. When management device 14 is turned on by an administrator, CPU 31 executes and runs OS software from nonvolatile memory 34. CPU 31 running the OS is capable of controlling each unit of management device 14 and of executing a plurality of programs in parallel. CPU 31 executes and runs the correspondence information management program from nonvolatile memory 34 if so instructed by an administrator.

CPU 31, by running the correspondence information management program, provides a user interface for enabling an administrator to input a phone number of a user who is no longer authorized to use an AP and an AP name of an AP whose use by the user is to be prohibited. When a phone number and an AP name input by an administrator through the user interface are received by CPU 31, CPU 31 deletes correspondence information containing the specified phone number and AP name from the correspondence information table and transmits a message, destined to the specified phone number, requesting the deletion of authorization information corresponding to the specified AP.

1-5: Operation

Description will now be given of a flow of an operation for prohibiting the use of an AP owned by a user in a communication system shown in FIG. 1, with reference to the sequence flowchart of FIG. 4. In two operation examples described below, DTE 11 stores four APs as shown in FIG. 2. Namely, there are stored in respective memory areas for each user in a nonvolatile memory 34 of DTE 11 two APs ("AP1" and "AP2") owned by a user (hereinafter, User X) whose phone number is "090XXXXXXXX" and two APs ("AP3" and "AP4") owned by a user (hereinafter, User Y) having a phone number of "090YYYYYYYY." Also, as shown in FIG. 2, nonvolatile memory 34 of a UIM 12 stores an authorization information table containing the phone number of User X and authorization information concerning an AP(s) owned by User X. This particular UIM 12 owned by User X is being mounted on the DTE 11 in the following examples.

Further, a correspondence information table containing five pairs of correspondence information as shown in FIG. 2 is stored in nonvolatile memory 34 of management device 14. Stored in the table are correspondence information for three APs owned by User X and correspondence information for two APs owned by User Y. It is further assumed that CPU 31 of DTE 11 is running the AP management program and that CPU 31 of UIM 12 is running the authorization information delete program.

1-5-1: Operation Example 1

CPU 31 of management device 14, when an instruction is given by an administrator to execute the correspondence information management program, executes and runs the program from nonvolatile memory 34. CPU 31, by running the correspondence information management program, reads all the correspondence information from the correspondence information table (refer to FIG. 2), and causes display unit 36 of management device 14 to display a management screen (refer to FIG. 5) showing the details of the correspondence information (FIG. 4: Step SA1). Specifically, CPU 31 displays on display unit 36 a management screen showing the phone number and the AP name of correspondence information in an area 51 and an area 52, respectively.

An administrator while viewing the management screen shown in FIG. 5 can now perform various input operations by operating operation unit 35. An administrator performs one or more of a selection operation of selecting, using a cursor key, a phone number of a user who is unauthorized to use an AP and an AP name whose use by the user is prohibited; a prohibiting operation of pressing a "PROHIBIT" button B1; and an end operation of pressing an "END" button B2.

Figure 4:
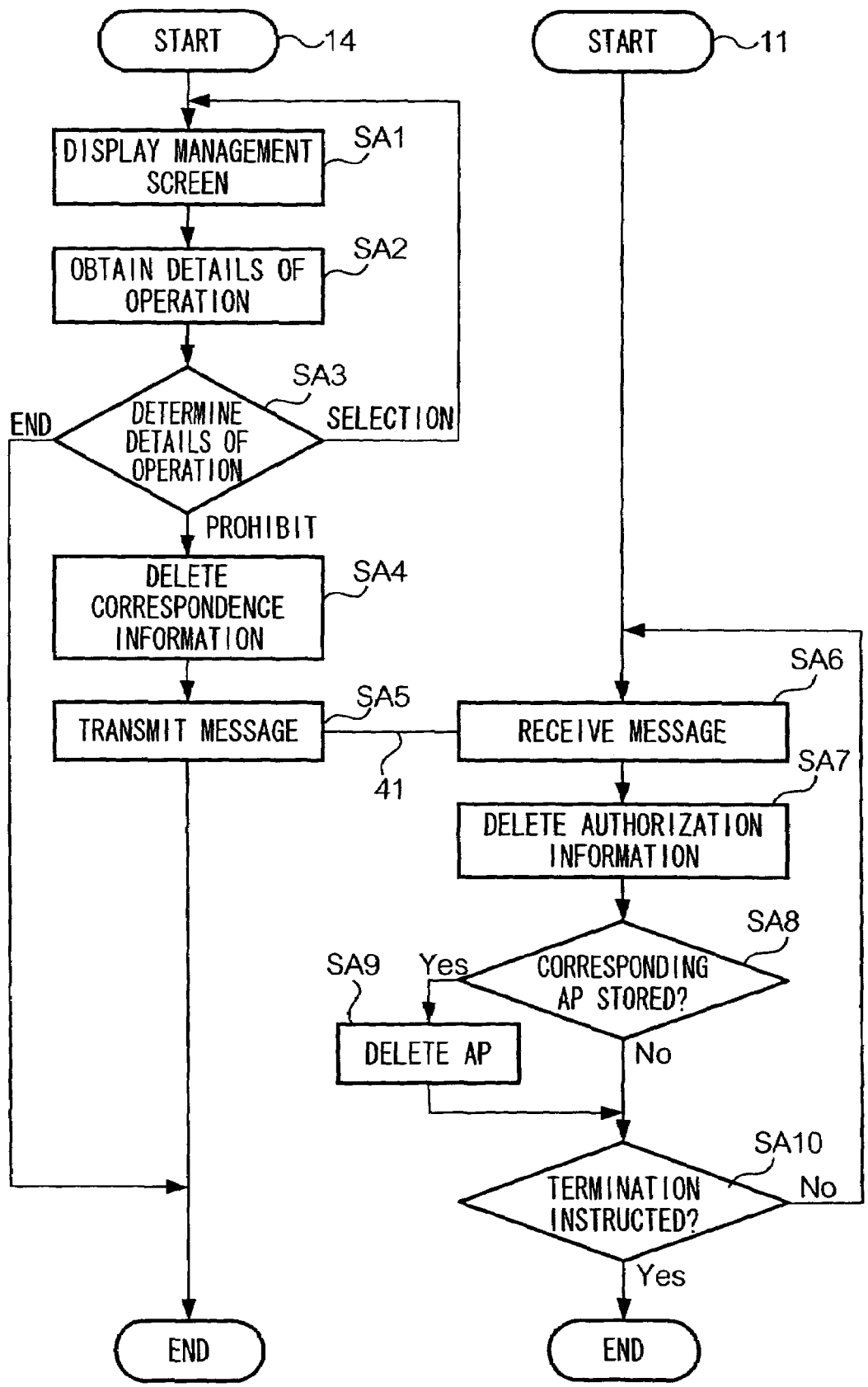
FIG. 4 is a sequence flowchart showing an AP (application program) management operation performed in the communication system.

CPU 31, while displaying the management screen shown in FIG. 5 displayed on display unit 36, receives data corresponding to an operation input of an administrator through operation unit 35 (FIG. 4: Step SA2), and determines the specifics of an operation input based on the data (FIG. 4: Step SA3). That is, CPU 31 determines which of a selection operation, prohibiting operation, or end operation is made by an administrator. When it is determined that a selection operation is made, CPU 31 highlights a selected phone number and an AP name selected by an administrator, and waits for an input operation to follow. In the case of an end operation, CPU 31 deletes the management screen from display unit 36, and terminates the execution of the correspondence information management program. When a prohibiting operation is made, CPU 31 performs processes on and after Step SA4. In the present operation example, a phone number of User X and AP1 owned by User X are selected by an administrator before the "PROHIBIT" button B1 is pressed.

In a case that it is determined in Step SA3 that an input operation made is a prohibiting operation, CPU 31 deletes from the correspondence information table correspondence information containing the selected phone number and the AP name on the management screen (refer to FIG. 5) (FIG. 4: Step SA4). CPU 31 then generates a message 41 for requesting deletion of authorization information corresponding to the selected AP name (AP1), and transmits the generated message 41 to the selected phone number (090XXXXXXXX) on the management screen (refer to FIG. 5) (FIG. 4: Step SA5), where message 41 contains data of an AP name for specifying an AP whose authorization information is to be deleted.

Message 41 transmitted from management device 14 in Step SA5 reaches a DTE 11 on which a UIM 12 storing the phone number of User X has been mounted, through a GW of communication network 13, a switching station and a base station (not shown) in the listed order.

CPU 31 of DTE 11 receives message 41 through communication unit 32 (FIG. 4: Step SA6), and requests CPU 31 of UIM 12 to delete authorization information (authorization information corresponding to AP1), specified by message 41 (FIG. 4: Step SA7). CPU 31 of UIM 12 deletes, according to the request, authorization information corresponding to AP1 from the authorization information table.

CPU 31 of DTE 11 then determines whether an AP whose authorization information is deleted in Step SA7 is stored in DTE 11 (FIG. 4: Step SA8). Specifically, CPU 31 determines whether there is any AP stored nonvolatile memory 34, which has the same AP name as that contained in message 41 and is related to the same phone number as that stored in UIM 12. In a case that where there is a corresponding AP, it is determined that there is stored in DTE 11 an AP whose authorization information was deleted in Step SA7 (FIG. 4: Step SA8; Yes).

When it is determined Yes in Step SA8, CPU 31 of DTE 11 deletes the identified AP from nonvolatile memory 34 (FIG. 4: Step SA9). In the example of operation, DTE 11 stores AP1 and the phone number of User X that is associated with the AP1 (refer to FIG. 2), the above Step SA9 is performed to delete AP1 from nonvolatile memory 34.

CPU 31 of DTE 11 then determines whether the termination of the AP management program is instructed by a user (FIG. 4: Step SA 10). When the termination is not instructed, CPU 31 waits for a message 41 transmitted from management device 14; while, when the termination is instructed, CPU 31 terminates the execution of the AP management program.

Figure 6:
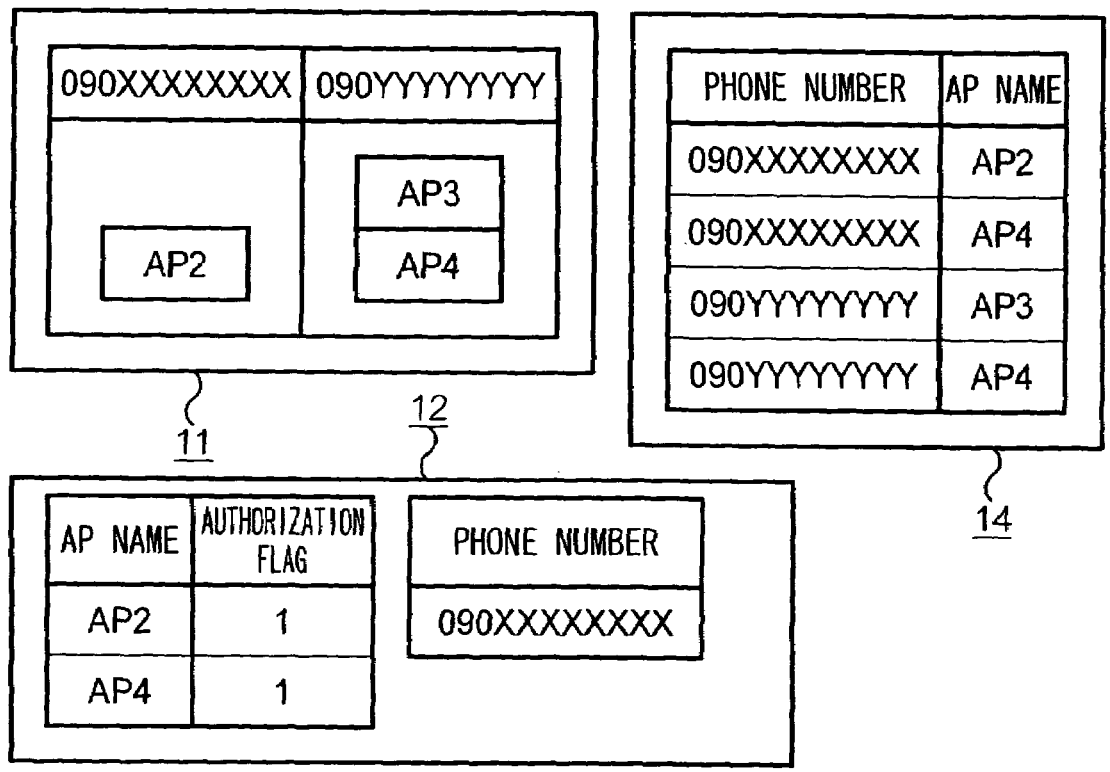
FIG. 6 is a diagram showing an example of details stored in DTE 11, UIM 12, and management device 14.

Details of data stored in nonvolatile memory 34 of DTE 11, UIM 12 and management device 14 are updated as shown in FIG. 6 after the above operation is completed. As shown, the phone number of User X and AP1 are deleted from the correspondence information table stored in nonvolatile memory 34 of management device 14; AP1 is deleted from nonvolatile memory 34 of DTE 11; and authorization information for AP1 is deleted from the authorization information table stored in nonvolatile memory 34 of UIM 12. Thus, User X can no longer use AP1 which s/he used to own since AP1 has been deleted from DTE 11.

1-5-2: Operation Example 2

Description will be now given of an example of an operation in a case where it is instructed at management device 14 to prohibit the use of AP4 owned by User X.

An operation performed by CPU 31 of management device 14 is the same as the operation from Steps SA1 to SA5 (refer to FIG. 4) of the first example, the operation performed by CPU 31 of management device 14 according to the present example being the processes from displaying a management screen (refer to FIG. 5) on display unit 36 after the correspondence information management program is activated by an administrator until the process of transmitting a message 41 in response to an instruction from the administrator. The present example of operation only differs from the first example in that a phone number of User X and AP4 owned by User X are selected by an administrator on the management screen (refer to FIG. 5), and the "PROHIBIT" button B1 is selected.

An operation performed by CPU 31 of DTE 11 in the present example are also the same as the operation of the Steps SA6 to SA8 (FIG. 4) performed by CPU 31 in the above first example operation, the operation of the present example being receiving a message 41 through communication unit 32, deleting the requested authorization information by the message 41 from UIM 12, and determining whether an AP whose authorization information has been deleted is stored in DTE 11. Step SA 9 is not performed in the present example since, as shown in FIG. 2, a phone number associated with AP4 stored in nonvolatile memory 34 of DTE 11 is the phone number of User Y, and CPU 31 therefore determines in Step SA8 that an AP whose authorization information has been deleted is not stored in DTE 11 (FIG. 4: Step SA8; No). From then on, CPU 31 of DTE 11 determines whether it is instructed to terminate the AP management program (FIG. 4: Step SA 10) and waits for a message 41 transmitted from management device 14 if termination is not instructed.

Figure 7:
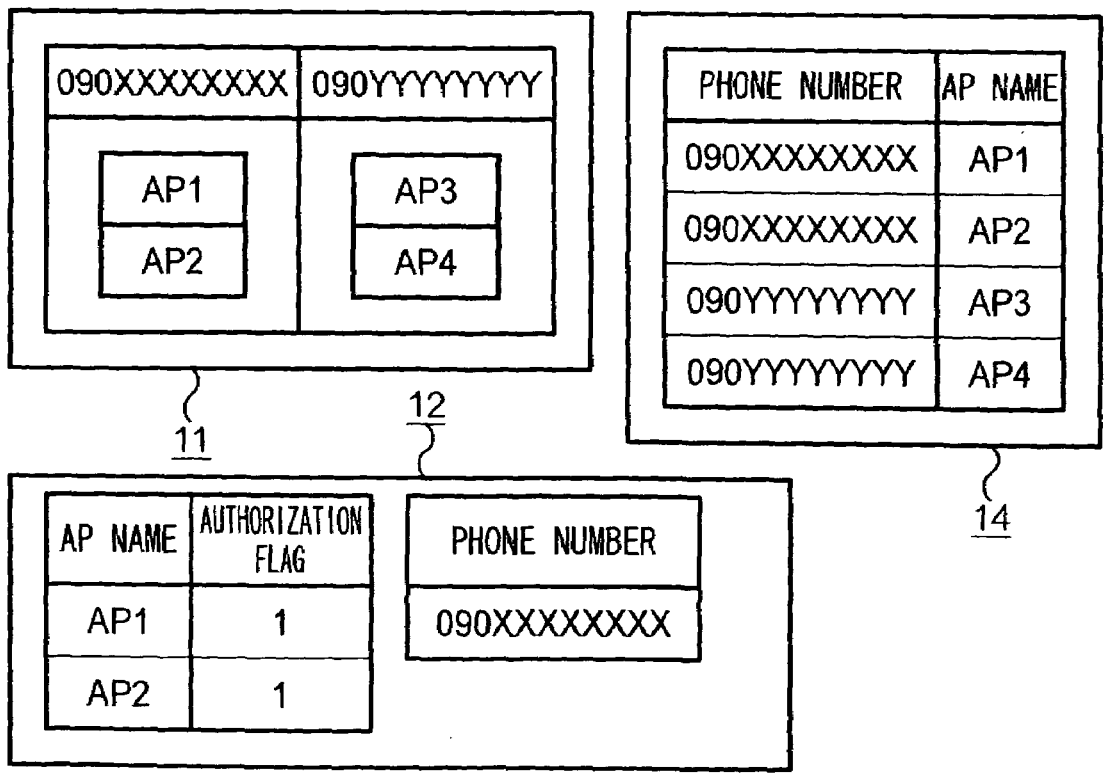
FIG. 7 is a diagram showing an example of details stored in DTE 11, UIM 12, and management device 14.

Data stored in each of nonvolatile memory 34 of DTE 11, UIM 12, management device 14 is updated to what is shown in FIG. 7 after the operation of the present example is performed. As shown, correspondence information containing the phone number of User X and AP4 associated thereto has been deleted from the correspondence information table stored in nonvolatile memory 34 of management device 14; authorization information corresponding to AP4 has been deleted from the authorization information table stored in nonvolatile memory 34 of UIM 12. As a consequence, User X is no longer able to use AP4 even if his/her UIM 12 is inserted in another DTE storing AP4 because authorization information for AP4 is no longer stored in UIM 12 which User X owns. Since AP4 stored in DTE 11 which is owned by User Y is not deleted in the present operation, User Y can continue using AP4.

1-6: Effects of First Embodiment

As described in the foregoing, according to the first embodiment of the present invention, deleting correspondence information showing a correspondence between information identifying a user and an AP owned by the user from management device 14 automatically causes a UIM 12 which the user owns to delete authorization information corresponding to the AP, whereby the AP can no longer be used by that particular user. Thus, a CP is able to reliably prevent unauthorized use of an AP.

An AP stored in DTE 11 can no longer be used after its authorization information stored in UIM 12 is deleted, but the AP is also deleted from nonvolatile memory 34 of DTE 11 according to the first embodiment. Thus, a further effect is attainable of avoiding a memory area of nonvolatile memory 34 being occupied by an AP that is no longer used.

2: Second Embodiment

Description will be now given of a second embodiment of the present invention with reference to the drawings.

2-1: Overall Configuration

Figure 8:
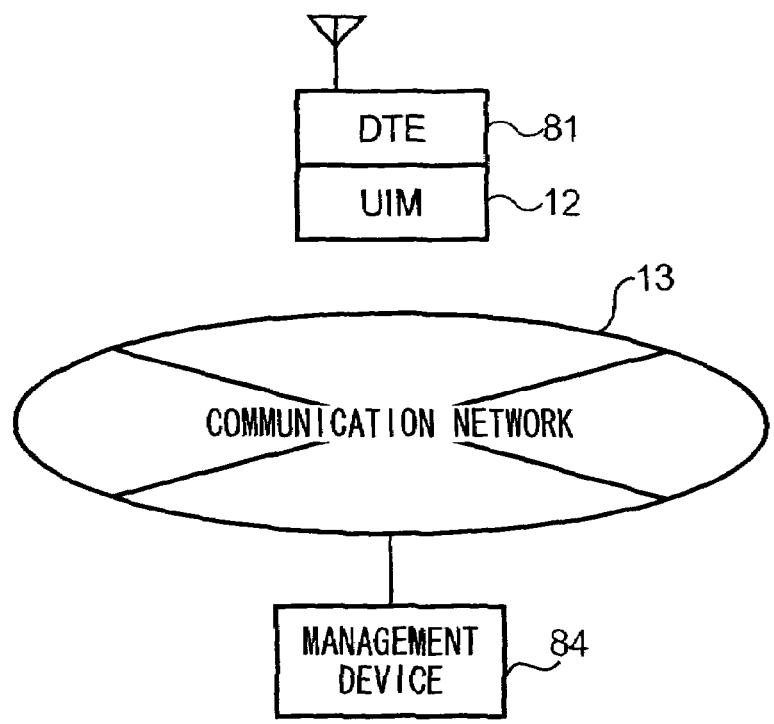
FIG. 8 is a diagram showing an example of a configuration of a communication system according to a second embodiment of the present invention.

FIG. 8 is a diagram showing an example of a configuration of a communication system according to a second embodiment of the present invention. The configuration of the communication system differs from that of the first embodiment (refer to FIG. 1) in that a DTE 81 is provided in place of DTE 11 and a management device 84 in place of management device 14.

In a communication system shown in FIG. 8, DTE 81, when instructed by a user to discontinue use of an AP, deletes authorization information corresponding to the AP from UIM 12. DTE 81 also determines whether the concerned AP is stored in the device itself, so as to delete the AP if it is determined that the AP is stored in the device. DTE 81 then requests management device 84 to delete correspondence information containing the AP and information identifying an owner user of the AP, to thereby cause management device 84 to delete the specified correspondence information.

2-2: Configuration and Function of DTE 81

The AP management program stored in nonvolatile memory 34 of DTE 81 differs from that stored in nonvolatile memory 34 of DTE 11. CPU 31 of DTE 81, when it is instructed by a user through operation unit 35 to execute the AP management program, executes and runs the AP management program from nonvolatile memory 34. CPU 31 of DTE 81 is imparted the following functions by executing the AP management program.

CPU 31 running the AP management program functions to cause a user to specify an AP s/he longer wishes to use, to delete authorization information corresponding to the specified AP, and to cause management device 84 to delete correspondence information for the AP. Specifically, when an instruction is received to execute the AP management program, CPU 31 first displays on display unit 36 a management screen shown in FIG. 9. Displayed in an area 91 of the management screen is a name(s) of an AP(s) whose authorization information is stored in a UIM 12 currently mounted on DTE 81. In the management screen shown in FIG. 9, a name of an AP which is no longer used is selected. When "PROHIBIT" button B1 is then pressed, CPU 31 deletes authorization information corresponding to the AP, and deletes the AP from the device itself if the AP is stored therein. CPU 31 then transmits to management device 84 a message requesting deletion of correspondence information containing an AP name of the AP and the phone number stored in UIM 12.

2-3: Configuration and Function of Management Device 84

A correspondence information management program stored in nonvolatile memory 34 of management device 84 differs from that stored in nonvolatile memory 34 of management device 14. CPU 31 of management device 84 executes and runs the correspondence information management program from nonvolatile memory 34 immediately after activating the OS.

CPU 31 running the correspondence information management program functions to receive a message transmitted from a DTE 81 through communication network 13, and to delete correspondence information specified in the message from the correspondence information table.

2-4: Operation

Figure 10:
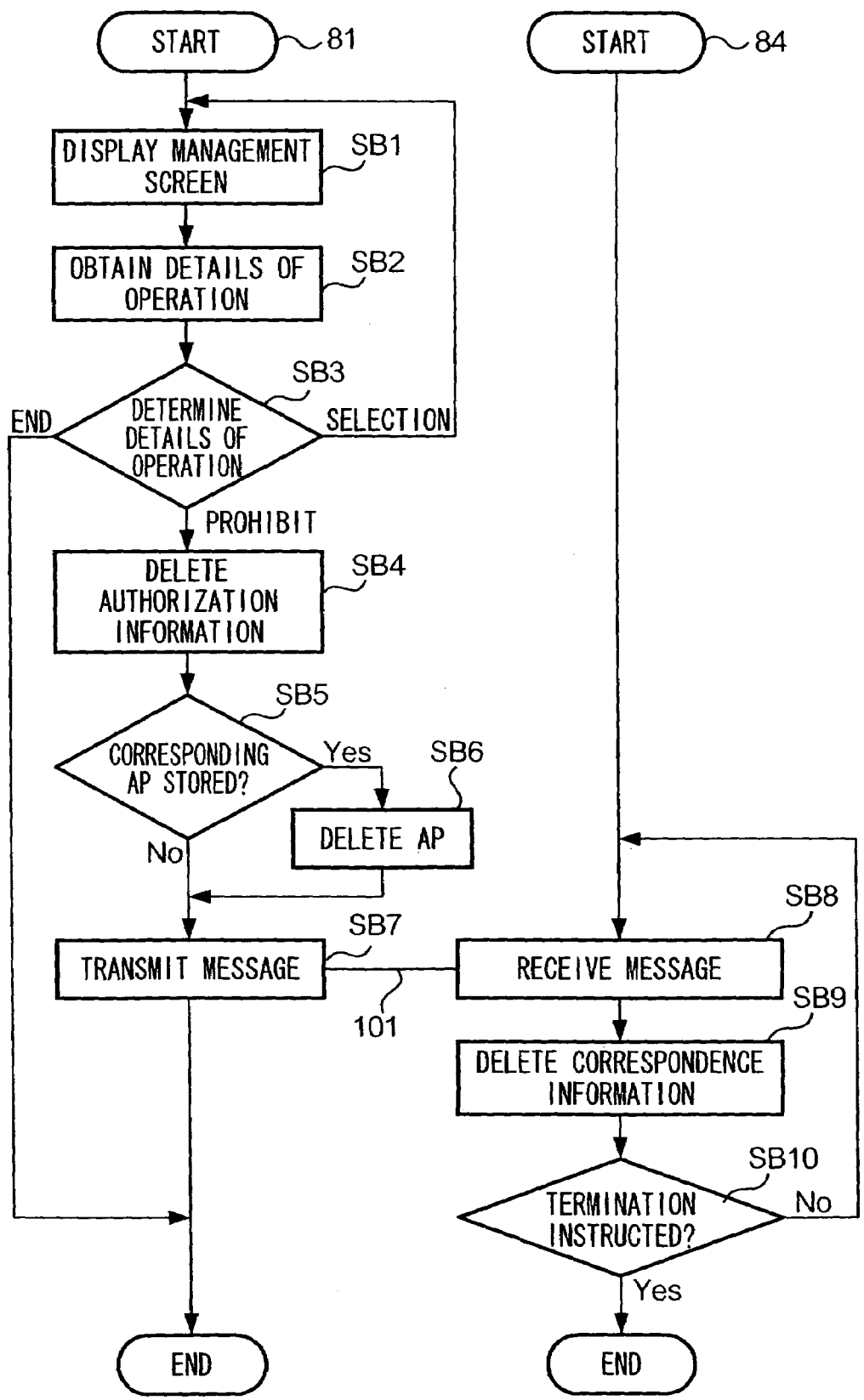
FIG. 10 is a sequence flowchart showing an AP management operation performed in the communication system.

Description will be now given of an operation of the second embodiment according to the present invention, specifically of an operation where an AP which a user no longer wishes to use is specified by the user at DTE 81, with reference to a sequence chart shown in FIG. 10.

The same situations as those of the first embodiment are assumed in the present description. APs stored in nonvolatile memory 34 of DTE 81 are the same as those stored in nonvolatile memory 34 of DTE 11; the details of a correspondence information table stored in nonvolatile memory 34 of management device 84 are the same as those of the correspondence information table stored in nonvolatile memory 34 of management device 14, as shown in FIG. 2.

2-4-1: Operation Example 3

CPU 31 of DTE 81, when it is instructed by a user to execute the AP management program, executes and runs the program from nonvolatile memory 34. CPU 31 running the AP management program first reads all authorization information stored in an authorization information table stored in UIM 12, obtains an AP name(s) contained in each authorization information, and displays a management screen (refer to FIG. 9) showing the obtained AP name(s) in area 91 (FIG. 10: Step SB1).

Figure 9:
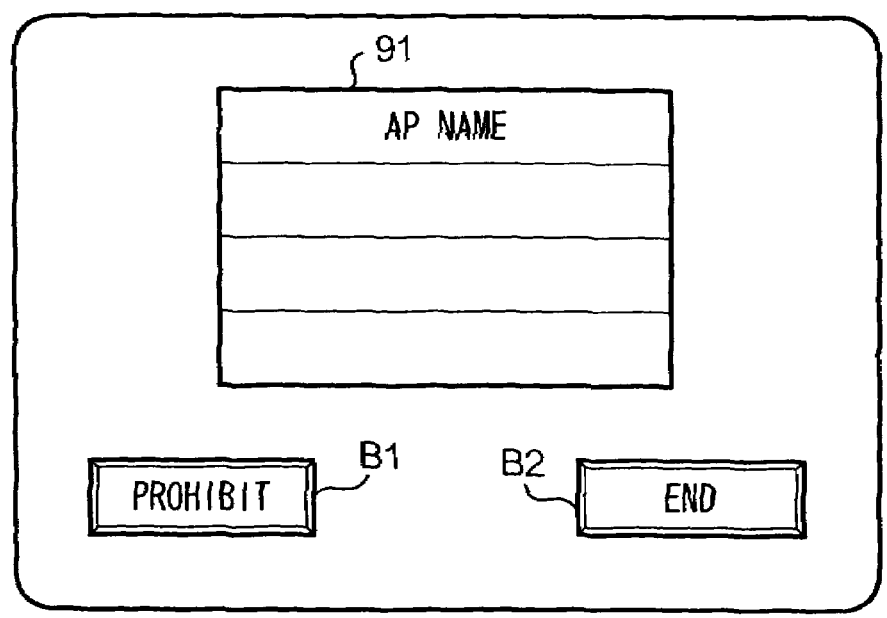
FIG. 9 is a diagram showing an example of a screen format of a management screen displayed on a display unit 36 of a DTE 81.

A user, while viewing the management screen shown in FIG. 9, is able to operate operation unit 35 to perform various input operations. CPU 31, while displaying the management screen of FIG. 9 on display unit 36, receives data corresponding to a user's operation from operation unit 35 (FIG. 10: Step SB2) to determine the specifics of the user's operation (FIG. 10: Step SB3). In a case that the user's operation is a selection operation, CPU 31 causes an AP name selected by the user to be highlighted, and waits for a user's operation. In a case that the user's operation is an end operation, CPU 31 terminates the execution of the AP management program. In a case that the user's operation is a prohibiting operation, CPU 31 performs process of Step SB4 and the following processes.

In the present example, AP1 is selected by a user, and the "PROHIBIT" button B1 is pressed. It is then determined in Step SB3 that the user's operation is a prohibiting operation, and CPU 31 of DTE 81 requests CPU 31 of UIM 12 to delete authorization information corresponding to an AP specified by the selected AP name in the management screen (refer to FIG. 9) (FIG. 10: Step SB4), to thereby cause CPU 31 of UIM 12 to delete the authorization information from the authorization information table.

CPU 31 of DTE 81 determines whether the AP whose authorization information has been deleted in Step SB4 is stored in the device 81 (FIG. 10: Step SB5). Specifically, CPU 31 determines whether there is stored in nonvolatile memory 34 an AP that is in correspondence with the same phone number as that stored in UIM 12 and that has the same AP name as the selected AP name by a user on the management screen (refer to FIG. 9).

CPU 31 of DTE 81 deletes an AP from nonvolatile memory 34 only when it is determined Yes in Step SB5 (FIG. 10: Step SB6). In the present example, a phone number associated with AP1 stored in nonvolatile memory 34 of DTE 81 is User X's phone number, and therefore, the process of Step SB6 is performed to delete AP1 from nonvolatile memory 34 of DTE 81.

CPU 31 of DTE 81 subsequently generates a message 101 requesting deletion of correspondence information containing an AP, no longer use of which is instructed by a user. The generated message 101 is transmitted through communication network 13 to management device 84 (FIG. 10: Step SB7). Message 101 contains an AP name of an AP of which a user has instructed to discontinue the use, and a phone number stored in UIM 12.

In Step SB7, the message 101 transmitted from DTE 81 reaches management device 84 connected to communication network 13 via a base station, a switching station (neither shown) of the network 13 in the listed order.

CPU 31 of management device 84 executing and running the correspondence information management program receives through communication unit 32 message 101 (FIG. 10: Step SB8), and deletes correspondence information from the correspondence information table, the deletion of which correspondence information is requested by message 101 (FIG. 10: Step SB9). CPU 31 of management device 84 determines whether termination of the correspondence information management program has been instructed by an administrator (FIG. 10: Step SB10). When termination is instructed, CPU 31 terminates the correspondence information management program; and if no such instruction is given, CPU 31 waits for a message 101 transmitted from DTE 81.

After the above operation is performed, details of the data stored in each nonvolatile memory 34 of DTE 81, UIM 12, and management device 84 are changed to those shown in FIG. 6.

2-4-2: Operation Example 4

Description will be now given of another example operation performed when a user instructs that s/he no longer wishes to use AP4 under the same preconditions as the above example operation 3.

An operation performed by user CPU 31 of DTE 81 after being instructed to execute the AP management program is the same as the operation detailed in Steps SB1 to SB5; and includes: displaying a management screen (refer to FIG. 9) on display unit 36; deleting from UIM 12 authorization information corresponding to an AP whose use is instructed to be stopped; and determining whether DTE 81 stores the same AP. The present example operation differs from the above example operation 3 in that the AP4 is selected in the management screen (FIG. 9) as an AP to be disabled.

As shown in FIG. 2, a phone number stored in correspondence with AP4 in nonvolatile memory 34 of DTE 81 is that of User Y. CPU 31 therefore determines that a corresponding AP is not stored in DTE 81, and does not perform the process of Step SB6. Subsequently, CPU 31 of DTE 81 and CPU 31 of management device 84 perform the same operation as Steps SB7 to SB10 of the above example operation 3, after which operation of the present example is completed. As a result, the details of data stored in each nonvolatile memory 34 of DTE 81, UIM 12, management device 84 are changed to those as shown in FIG. 7.

2-5: Effects of Second Embodiment

As described in the foregoing, the second embodiment enables a user to quickly indicate his/her intention that s/he no longer wishes to use a particular AP, thereby avoiding expenditure of time and effort that would otherwise be incurred in canceling a usage contract on a document basis, since correspondence information containing a particular AP stored in management device 84 is automatically deleted if a user disables the AP at DTE 81.

Further, as in the first embodiment, an AP is deleted from nonvolatile memory 34 of DTE 81 after its corresponding authorization information has been deleted from UIM 12, thereby avoiding a memory of nonvolatile memory 34 being occupied by an AP that is no longer used.

3: Modification

In the foregoing, description has been given of the first and second embodiments of the present invention, but the present invention is not limited to them. The following example modifications are conceived on the basis of the above embodiments.

3-1: Modification 1

In the above first and second embodiments, an AP is used as an example of content stored in a communication terminal device, but such content is not limited to an AP. Content may be voice information for causing a communication terminal device to sound a melody; or may be image information for causing a communication terminal device to display a standby image on its screen.

3-2: Modification 2

In the above first and second embodiments, an AP whose authorization information has been deleted in UIM 12 is deleted from nonvolatile memory 34 for the purpose of effectively using the memory area of nonvolatile memory 34, but an AP need not necessarily be deleted in a case that its authorization information is deleted.

In the first and second embodiments, description is given of a case where authorization information is deleted from UIM 12. Instead, authorization flag contained in the authorization information may be updated to a value that shows that the AP can no longer be used.

3-3: Modification 3

In the first embodiment, message 41 is automatically transmitted to DTE 11 by CPU 31 of management device 14 (FIG. 4: Step SA5), after correspondence information stored in management device 14 is deleted (FIG. 4: Step SA4), while CPU 31 is executing the correspondence information management program. CPU 31 may be caused to determine whether message 41 can be transmitted to a phone number of a user whose use of an AP is prohibited by an administrator. Message 41 is transmitted only when it is determined that it can be transmitted.

Specifically, CPU 31 of management device 14 is caused to determine, before Step SA4 and after Step SA5 in the flowchart shown in FIG. 4, whether DTE 11 having mounted thereto UIM 12 storing the destination phone number of message 41 is served by communication network 13. In a case that it is determined that DTE 11 is served by communication network 13, CPU 31 transmits message 41 through communication network 13 to DTE 11 (FIG. 4: Step SA5). In a case that it is determined that DTE 11 is not served by communication network 13, CPU 31 repeats the determination until DTE 11 is found for service by communication network 13.

Similarly, in the above second embodiment, message 101 is automatically transmitted by CPU 31 of DTE 81 (FIG. 10: Step SB7), while CPU 31 is executing the AP management program, after authorization information is deleted (FIG. 10: Step SB4) and an AP is deleted (FIG. 10: Step SB6). Message 101 may be transmitted to a base station (not shown) of communication network 13 only when DTE 81 and the base station can be wirelessly communicated.

3-4: Modification 4

In the above first embodiment, CPU 31 of management device 14 while executing the correspondence information management program terminates execution of the program immediately after transmitting a message 41 (FIG. 4: Step SA5). CPU 31 may terminate execution of the program after it is confirmed that authorization information corresponding to an AP to be disabled as requested in message 41 is deleted from UIM 12.

Specifically, CPU 31 of DTE 11 executing the AP management program, after receiving message 41 (FIG. 4: Step SA6), deletes authorization information of an AP which is requested to be disabled by message 41 (FIG. 4: Step SA7), and then transmits notification to management device 14 through communication network 13, such notification showing that the authorization information has been deleted. CPU 31 of management device 14 executing the correspondence information management program terminates the execution of the program after receiving the notification. Alternatively or additionally, CPU 31 of management device 14 executing and running the correspondence information management program may retransmit message 41 in a case that no notification is received after a predetermined time has elapsed.

3-5: Modification 5

In the first embodiment, description is given of a case where UIM 12 is mounted on DTE 11 prior to the start of the operation. However, CPU 31 of DTE 11 may be caused to determine, when UIM 12 is mounted on DTE 11 and the device 11 is turned on, whether authorization information stored in UIM 12 correspond to an AP(s) stored in DTE 11, and then to delete an AP(s) from nonvolatile memory 34 if its corresponding authorization information is not stored in UIM 12.

Figure 11:
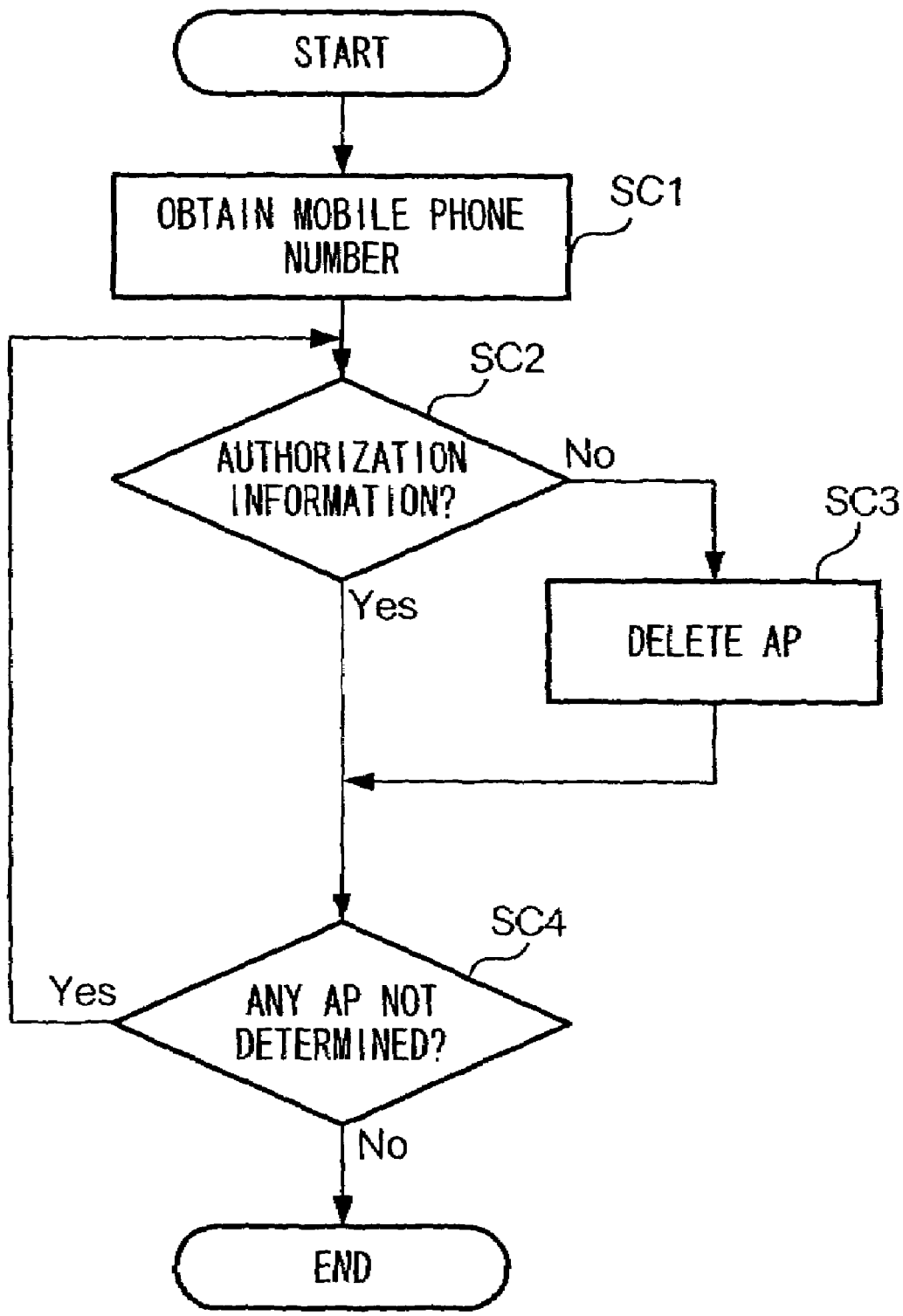
FIG. 11 is a flowchart showing a flow of an AP deletion process according to a modification 4.

A specific process of deleting an unnecessary AP is such as shown in FIG. 11. As shown in the figure, CPU 31 of DTE 11 obtains a phone number stored in UIM 12 (Step SC1).

CPU 31 then determines whether an AP stored in a memory area for the phone number obtained in Step SC1 has corresponding authorization information stored in nonvolatile memory 34 of UIM 12 (Step SC2). An AP is deleted from nonvolatile memory 34 of DTE 11 in a case that authorization information containing an AP name for the AP is not stored in nonvolatile memory 34 of UIM 12 (Step SC3).

In Step SC4, CPU 31 determines whether the determination of Step SC2 is performed for every AP stored in the memory area for the phone number obtained in Step SC1 (Step SC4). The program is terminated when the determination is performed for every AP, and if not, the process on and after Step SC2 is performed for an AP on which the determination is not yet been performed.

As described above, an AP is deleted if its corresponding authorization information is not stored in UIM 12, i.e., an AP whose use is no longer allowed is deleted. As a consequence, a memory area in nonvolatile memory 34 of DTE 11 can efficiently be used. A program for deleting an unnecessary AP (hereinafter, an AP delete program) may be stored in nonvolatile memory 34 of DTE 11 independently of the AP management program and executed and run by CPU 31 immediately after the OS is activated. Alternatively, Steps SC1-SC4 may be a sub-routine of the AP management program and performed before Step SA6 (refer to FIG. 4).

Further, CPU 31 of DTE 81 according to the second embodiment may be caused to execute the AP deleting process of the present modification. Specifically, the AP delete program may be stored in nonvolatile memory 34 of DTE 81 independently of the AP management program, and be executed and run by CPU 31 as soon as the activation of an OS is completed. Alternatively, the above Steps SC1-SC4 may be a sub-routine of the AP management program and be performed before Step SB1 (refer to FIG. 9).

3-6: Modification 6

In the first and second embodiments, the AP management program is stored in nonvolatile memory 34 of DTE 11 and 81, and CPU 31 of DTE 11 and 81 is caused to execute and run the AP management program. Alternatively, the AP management program may be stored in nonvolatile memory 34 of UIM 12, and CPU 31 of UIM 12 may be caused to execute and run the AP management program.

3-7: Modification 7

In the above first and second embodiments, an example of a communication terminal device given is a mobile phone having a browsing function and a capability of receiving a removable information storage module. A communication terminal device according to the present invention is not limited to such a mobile phone but may also be a PDA (Personal Digital Assistance) or any other device that has a communication function, a program execution function, and a capability of receiving a removable information storage module.

3-8: Modification 8

In the second embodiment, any user is allowed to delete an AP stored in DTE 81, but a user who is allowed to delete an AP may be limited to an owner of UIM 12 mounted to DTE 81.

Specifically, a password may be set by a user owning a UIM 12 and stored in nonvolatile memory 34 of the UIM 12. When the execution of the AP management program is instructed at DTE 81, CPU 31 of DTE 81 is first caused to display on display unit 36 a prompt screen for prompting a user to input a password. CPU 31 may be caused to display the management screen (refer to FIG. 9) on display unit 36 only when a password input by the user corresponds to the password stored in nonvolatile memory 34 of UIM 12.

3-9: Modification 9

In the first and second embodiments, the AP management program is stored in advance in nonvolatile memory 34 of a communication terminal device. Alternatively, it is possible to store the AP management program in a general communication terminal device that is capable of receiving a removable information storage module, thereby providing to such a general communication terminal device the same function as that of DTE 11 and DTE 81.

Specifically, the AP management program stored in a computer readable recording medium can be read from the medium through an auxiliary storage device connected to the external connection interface unit 37 of the management device 14 or 84 so that the AP management program is stored in nonvolatile memory 34 of the management device. The program then may be downloaded from the management device to the communication terminal device, so as to be stored therein.

In the first and second embodiments, the authorization information delete program is stored in advance in nonvolatile memory 34 of UIM 12, but a general information storage module may be provided with the same function as that of UIM 12 of the present invention, by storing the program in such a general information storage module.

Specifically, the authorization information delete program may be stored in a general information storage module using the same procedure as that for storing the AP management program for a communication terminal device. That is, an auxiliary storage device may be used to read the authorization information delete program from a computer readable recording medium to store the program in management device 14. The program is then downloaded to a communication terminal device having mounted thereto an information storage module, so that the program is stored in the information storage module.

It is therefore intended that the foregoing detailed description be regarded as illustrative rather than limiting, and that it be understood that it is the following claims, including all equivalents, that are intended to define the spirit and scope of this invention.

The invention claimed is:

1. A communication system comprising:
    an information storage module that includes:
        a user identification memory operable to store a user identifier to uniquely identify in a communication network a user of the information storage module; and
        an authorization memory operable to store authorization information comprising a plurality of content identifiers that uniquely identify a plurality of respective downloaded application programs and a plurality of permission indications set by a content provider to prevent unauthorized use of the respective downloaded application programs, the authorization information individually associated with the user identifier, and each of the permission indications configured by the content provider to provide discrete individual authorization for the user to execute each of the respective downloaded application programs;

a communication terminal device that includes:

an external connection interface by which the information storage module is mountable on the communication terminal device, the information storage module configured to be supplied power by the communication terminal device through the external connection interface;

a content memory configured to store the downloaded application programs; and a content controller operable to enable execution of authorized downloaded application programs and disable execution of an unauthorized downloaded application program, the unauthorized downloaded application program being included among the downloaded application programs stored in the content memory for which respective authorization information is not stored in the information storage module when the information storage module is mounted on the communication terminal device; and a management device configured to communicate with the communication terminal over the communication network, the management device including a correspondence memory operable to store a plurality of items of correspondence information, the management device further configured to individually manage each of the items of correspondence information, wherein each of the items of correspondence information is discretely indicative of an association between the user and a respective one of the downloaded application programs the user is authorized to execute.

2. The communication system of claim 1, wherein the management device further comprises a memory controller operable to delete an item of correspondence information pertaining to the unauthorized downloaded application program for which execution has been disabled by the content controller.

3. The communication system of claim 2, wherein the management device further comprises a terminal controller operable to control the communication terminal device to delete authorization information corresponding to the unauthorized downloaded application program from the information storage module mountable on the communication terminal device.

4. The communication system of claim 2, wherein the management device further comprises a terminal controller operable to control the information storage module mountable on the communication terminal to delete authorization information corresponding to the unauthorized downloaded application program.

5. The communication system of claim 1, wherein the management device is operable to request the communication terminal device to delete one of the downloaded application programs for which execution by the user is no longer authorized; and wherein the communication terminal device is operable, when the information storage module is mounted thereon, to store the downloaded application programs in the content memory in association with the user identifier of the user authorized to execute the downloaded application programs, and the communication terminal device is further operable to delete the one of the downloaded application programs in response to a delete request by the management device, if the user identifier stored in the communication terminal device in association with the one of the downloaded application programs is the same as the user identifier stored in the information storage module mountable on the communication terminal device.

6. The communication system of claim 1, wherein the communication terminal device is further operable to store each of the respective downloaded application programs in the content memory in association with a respective one of the content identifiers, and the communication terminal device is further operable, when the information storage module is mounted thereon, to delete one of the downloaded application programs, whose respective authorization information is not stored in the information storage module, from among the respective downloaded application programs stored in association with the respective content identifiers that are stored in the information storage module.

7. The communication system of claim 1, wherein the management device is operable to determine whether the management device can communicate with the information storage module; and when no communication is possible, the management device is operable to direct the communication terminal device to delete authorization information for a respective one of the downloaded application programs whose execution is to be disabled when communication with the information storage module becomes possible.

8. The communication system of claim 1, wherein the communication terminal device further comprises a user interface operable to prompt a user to specify one of the downloaded application programs which is no longer used by the user from among the stored downloaded application programs, and a memory controller operable to delete respective authorization information, for the one of the downloaded application programs specified by the user, from the information storage module mounted thereon.

9. The communication system of claim 8, wherein the communication terminal device further comprises a terminal controller operable to direct the management device to delete an item of correspondence information corresponding to the specified one of the downloaded application programs.

10. The communication system of claim 8, wherein the communication terminal device is operable to determine whether the specified one of the downloaded application programs that is no longer used corresponds to a user identified by the user identifier stored in the information storage module mountable thereon.

11. The communication system of claim 8, wherein the memory controller is further operable to delete the respective authorization information for the specified one of the downloaded application programs from the information storage module only when it is determined that the authorization information corresponds to the specified one of the downloaded application programs.

12. A communication system comprising:

a management device that includes a correspondence memory operable to store correspondence information indicative of an association between a user and stored application programs that are independently and discretely authorized for execution;

a communication terminal device that includes:

a content memory configured to store a plurality of downloaded application programs; and a communication unit operable to communicate with the management device over a communication network; and an information storage module that includes:

an external connection interface by which the information storage module is mountable on the communication terminal device;

a user identification memory operable to store a user identifier to uniquely identify a user in the communication network, and to enable receipt through the communication network by the communication terminal device of information that is destined for the user identifier, an authorization memory operable to store authorization information comprising a plurality of content identifiers that are each associated with a respective one of the downloaded application programs, each of the content identifiers also discretely associate with the user identifier and with a respective authorization indication set by a content provider to be indicative of authorization for the user to execute a respective one of the downloaded application programs; and a content controller operable to disable execution of an unauthorized downloaded application program, the unauthorized downloaded application program being one of the downloaded application programs stored in the content memory for which respective authorization information is not stored in the information storage module when the information storage module is mounted on the communication terminal device.

13. The communication system of claim 12, wherein the communication terminal includes a user interface operable to prompt the user to specify a downloaded application program from among the stored downloaded application programs that is no longer executed by the user.

14. The communication system of claim 13, wherein the information storage module further includes a memory controller operable to delete from the information storage module authorization information for the downloaded application program specified by the user.

15. The communication system of claim 14, wherein the information storage module includes a terminal controller operable to direct the management device to delete an item of correspondence information corresponding to the downloaded application program specified by the user.

16. The communication system of claim 15, wherein the information storage module is operable to determine whether the downloaded application program specified by the user is associated with the user identifier stored in the user identification memory, the information storage module further operable to delete authorization information for the downloaded application program specified by the user from the information storage module only when it is determined that the downloaded application program specified by the user is associated with the user identifier.

17. A communication terminal device, comprising:
a first memory configured to store a plurality of downloaded application programs owned by a user;
an external connection interface by which a removable information storage module is mountable on the communication terminal device,
wherein the removable information storage module includes a second memory operable to store a user identifier uniquely identifying the user in a communication network, and authorization information for each of the downloaded application programs that individually and discretely indicates the user is authorized to execute a respective one of the downloaded application programs, wherein respective authorization information is set by a content provider to prevent unauthorized use of respective downloaded application programs, and wherein the user identifier is usable by the communication terminal device to enable receipt through the communication network by the communication terminal device of information designated with the user identifier; and a content controller operable to disable use of an unauthorized downloaded application program when the information storage module is mounted on the communication terminal device, the unauthorized downloaded application program being one of the downloaded application programs stored in the first memory for which respective authorization information is not stored in the information storage module.

18. The communication terminal device of claim 17, further comprising a memory controller that is operable to disable use of an additional unauthorized downloaded application program in response to receipt over a network of a notification received from a management device, the management device operable to manage and store correspondence information for each of the downloaded application programs, the correspondence information indicative of an association between the user and each of the respective stored downloaded application programs the user is authorized to execute.

19. The communication terminal device of claim 18, wherein the memory controller, in response to receipt of the notification is operable to direct the removable information storage module to delete authorization information associated with the additional unauthorized downloaded application program.

20. The communication terminal device of claim 17, further comprising a user interface operable to prompt the user to specify a downloaded application program from among the downloaded application programs with respective authorization information stored in the removable information storage module.

21. The communication terminal device of claim 20, further comprising a memory controller that is operable to delete from the information storage module, authorization information for the downloaded application program specified by the user.

22. The communication terminal device of claim 21, further comprising a terminal controller operable to direct a management device to delete an item of correspondence information corresponding to the downloaded application program specified by the user, the management device including a third memory operable to store correspondence information indicative of an association between the user and each of the stored downloaded application programs the user is authorized to execute.

23. The communication terminal device of claim 17, wherein the user identifier is a phone number owned by the user.

24. An information storage module, comprising:
a user identification memory operable to store a user identifier for uniquely identifying a user in a communication network,
an authorization memory operable to store authorization information that includes each of a plurality of discrete authorizations of the user to execute each of a respective plurality of downloaded application programs that are stored external to the information storage module, wherein the discrete authorizations are set by a content provider;
an external connection interface by which the information storage module is mountable on a communication terminal device, wherein the communication terminal device is configured to store the downloaded application programs that are stored external to the information storage module;

a content controller operable to disable use of an unauthorized downloaded application program when the information storage module is mounted on the communication terminal device, the unauthorized downloaded application program being a first downloaded application program included in the downloaded application programs stored in the communication terminal device for which a first respective authorization corresponding to the first content is not stored in the information storage module; and a memory controller operable to delete a second authorization included in the plurality of authorizations, the second authorization corresponding to a second downloaded application program included in the downloaded application programs that is specified in a notification receivable with the memory controller over a network from a management device.

25. The information storage module of claim 24, wherein the communication terminal device includes a content memory configured to store the downloaded application programs that are stored external to the information storage module, and a communication unit operable to communicate with the management device, the management device operable to store correspondence information indicative of an association between the user and each of the stored downloaded application programs the user is authorized to execute.

26. The information storage module of claim 25, wherein the notification is receivable by the memory controller in response to an item of correspondence information indicative that one of the stored downloaded application programs is disabled from being executed by the user.

27. The information storage module of claim 24, wherein the notification is receivable from the communication device in response to a downloaded application program specified from among the stored downloaded application programs to no longer be executed by a user.

28. The information storage module of claim 27, further comprising a terminal controller operable to direct the memory controller to delete an item of correspondence information corresponding to the specified downloaded application program, wherein the correspondence information is indicative of an association of the user and each of the stored downloaded application programs the user is authorized to execute.

29. A communication system comprising:

a communication terminal;

an information storage module configured to be coupled with the communication terminal to enable the communication terminal to operate on a communication network with a unique identifier of a user that is stored in the information storage module;

wherein the communication terminal is configured to enable download over the communication network, and storage in association with the unique identifier, of a plurality of downloaded application programs; and wherein the information storage module is operable to store a content name of each of the downloaded and stored application programs, each in association with a respective one of a plurality of discrete authorization indications set by a content provider to prevent unauthorized use of the respective downloaded and stored application programs, wherein only a downloaded application program associated with a respective authorization indication is executable with the communication terminal while the information storage module is coupled thereto.

30. The communication system of claim 29, wherein the communication terminal is operable to disable a respective one of the authorization indications stored in the information storage module in response to receipt over the communication network of a disable downloaded application program request message that includes the unique identifier of the user and an identifier of one of the downloaded application programs stored in the communication terminal that is associated with the respective one of the authorization indications to be disabled.

31. The communication system of claim 30, wherein the communication terminal is further operable to delete the one of the downloaded application programs stored in the communication terminal that is associated with the respective one of the authorization indications and the unique identifier of the user.

32. The communication system of claim 29, wherein the information storage module is operable to disable one of the respective authorization indications stored in the information storage module in response to receipt of a user command via the communication terminal to discontinue use of at one of the downloaded application programs corresponding to the one of the respective authorization indications.

33. The communication system of claim 32, wherein the communication terminal is further operable to delete the one of the downloaded application programs stored in the communication terminal in association with the respective one of the authorization indications and the unique identifier of the user.

34. The communication system of claim 32, wherein the communication terminal is further operable to generate a message to request deletion of a content identifier of the one of the downloaded application programs and the unique identifier of the user associated therewith, the message transmittable for receipt by a management device that includes a table of unique identifiers of users associated with respective user owned downloaded contents the respective users are authorized to use.

35. The communication system of claim 32, wherein the information storage module is further operable to generate a message to request deletion of a content identifier of the one of the downloaded application programs and the unique identifier of the user associated therewith, the message transmittable with the communication terminal for receipt by a management device that includes a table of unique identifiers of users associated with respective user owned downloaded application programs the respective users are authorized to execute.

36. The communication system of claim 32, wherein the communication terminal includes a user interface, the at least one of the downloaded application programs selectable from an application management screen displayable with the user interface to generate the user command.

37. The communication system of claim 29, wherein the communication terminal is configured to supply power to energize the information storage module when the information storage module is coupled thereto.

38. The communication system of claim 29, wherein the communication terminal, when first energized, is configured to delete an identified one of the downloaded and stored application programs that do not have an application name and a respective authorization indication stored in the information storage module coupled thereto.

39. The communication system of claim 29, wherein the downloaded application programs comprise are a plurality of images or a plurality of audible information files.

40. A method of operating a communication terminal in a communication system, the method comprising:
coupling an information storage module with a communication terminal to be in communication with the communication terminal;
enabling the communication terminal to communicate over a communication network based on a unique user identifier stored in the information storage module that uniquely identifies a user of the communication terminal;
storing a plurality of downloaded application programs in the communication terminal, each of the downloaded application programs stored in association with the unique user identifier;
storing in the information storage module a plurality of respective content identifiers of each of the downloaded application programs in association with a plurality of respective authorization identifiers, wherein each of the respective authorization identifiers is set by a content provider to prevent unauthorized use of the respective downloaded application programs and enables execution with the communication terminal of an associated one of the downloaded application programs only while the information storage module is coupled with the communication terminal; and
deleting an authorization identifier from the information storage module when use of a downloaded application programs that is associated with the authorization identifier is prohibited.

41. The method of claim 40, wherein deleting the authorization identifier comprises deleting the authorization identifier in response to receipt over the communication network of a request message to delete the authorization identifier.

42. The method of claim 40, wherein deleting the authorization identifier comprises deleting the authorization identifier in response to receipt of a user command input via the communication terminal.

43. The method of claim 40, wherein coupling an information storage module with a communication terminal comprises powering the information storage module with power supplied by the communication terminal.

44. The method of claim 40, wherein the unique user identifier is a phone number owned by a user of the information storage module.

45. The method of claim 40, wherein deleting the authorization identifier comprises also deleting the downloaded application program that is associated with the authorization identifier from the communication terminal.

46. The method of claim 40, wherein deleting the authorization identifier comprises transmitting with the communication terminal a response message that indicates the authorization identifier has been deleted.

47. The method of claim 40, wherein coupling an information storage module with a communication terminal comprises when the communication terminal is first energized, deleting one of the downloaded and stored application programs that does not have a content name and a respective authorization indication stored in the information storage module coupled thereto.

\* \* \* \* \*

UNITED STATES PATENT AND TRADEMARK OFFICE
CERTIFICATE OF CORRECTION

PATENT NO. : 7,450,929 B2  
APPLICATION NO. : 11/016570  
DATED : November 11, 2008  
INVENTOR(S) : Satoshi Washio et al.

Page 1 of 1

It is certified that error appears in the above-identified patent and that said Letters Patent is hereby corrected as shown below:

On the Title Page, Item -56-, Foreign Patent Documents

Delete "JP 1 280 149 1/2003" and insert --EP 1 280 149 1/2003--

Column 22

Line 1, delete "usable" and insert --useable--

Column 25

Line 2, delete the word "are" after "comprise"

Signed and Sealed this

Third Day of March, 2009

JOHN DOLL  
*Acting Director of the United States Patent and Trademark Office*